United States Patent [19]
Brody et al.

[11] 3,967,558
[45] July 6, 1976

[54] PROPELLANT GRAIN SUPPORT APPARATUS

[75] Inventors: Frank A. Brody, Rockaway; Emil K. Merz, Pompton Lakes; Peter Van den Houten, Dover, all of N.J.

[73] Assignee: The United States of America as represented by the Secretary of the Army, Washington, D.C.

[22] Filed: Dec. 9, 1974

[21] Appl. No.: 530,892

[52] U.S. Cl. .................................. 102/99; 102/102
[51] Int. Cl.² .......................................... C06D 5/04
[58] Field of Search ..................... 102/99, 100, 102; 60/255

[56] References Cited
UNITED STATES PATENTS

| | | | |
|---|---|---|---|
| 2,488,154 | 11/1949 | Africano | 60/255 |
| 3,731,628 | 5/1973 | Fink | 60/255 |
| 3,898,934 | 8/1975 | Mercier et al. | 102/100 |

FOREIGN PATENTS OR APPLICATIONS

| | | | |
|---|---|---|---|
| 1,189,854 | 3/1959 | France | 102/99 |

*Primary Examiner*—Verlin R. Pendegrass
*Attorney, Agent, or Firm*—Nathan Edelberg; A. Victor Erkkila; Max Yarmovsky

[57] ABSTRACT

Propellant grain material in the form of corrugated rectangularly shaped perforated strips is supported in a radial cylindrical configuration by support rings and a plurality of equally spaced longitudinal support blocks. The longitudinal and cylindrical support structures support the propellant material during combustion and orientate the strip for uniform ignition of all surfaces. The propellant strips are designed to aid in their assembly to the support structure, to provide channels through which the propellant surfaces may be ignited, and in addition, to provide paths through which gas produced can be more uniformly exhausted.

4 Claims, 2 Drawing Figures

U.S. Patent  July 6, 1976  3,967,558
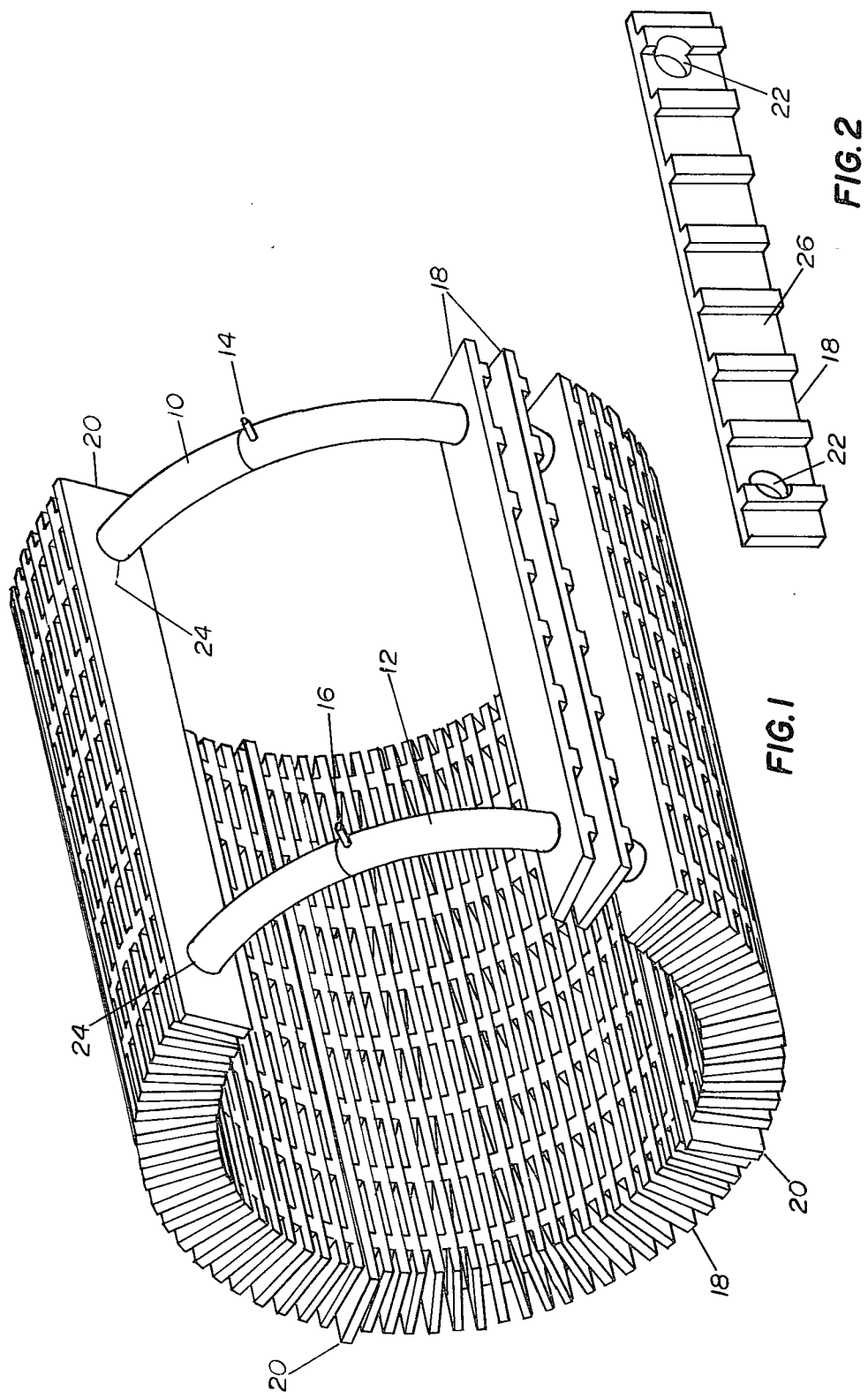

PROPELLANT GRAIN SUPPORT APPARATUS

GOVERNMENT INTEREST

The invention described herein may be manufactured, used and licensed by or for the Government for governmental purposes without the payment to us of any royalty thereon.

BACKGROUND OF THE INVENTION

Various means have been used in the prior art to increase the muzzle velocity for ammunition fired in recoilless rifles. Prior art propellant charges for recoilless gun systems used propellant grains which were fabricated in short lengths of round propellant material perforated to obtain a desired web thickness. These prior art charge assemblies consisted of the required number of grains loaded in a packed-bed arrangement having random orientation and unsupported except for adjacent grain surfaces. Due to this random orientation of the grains, simultaneous ignition on all surfaces is impossible to achieve when the charge is initiated and results in a delay of burning on surfaces not ignited initially. Since extremely short burning cycles are required for recoilless rifle propellant designs, this delay results in unburnt portions of the propellant grain being ejected from the system in the nozzle exhaust. Ejection of unburnt propellant material represents loss of energy, thus reducing overall system efficiency and causing conditions which result in non-uniform interior and exterior ballistics performance. These problems in prior art propellant grain materials cause inaccuracy in present recoilless rifle systems.

One of the prior art means for solving the aforementioned problems was to include a trapping arrangement in the system hardware which limited material size in the gas exhaust or otherwise delayed ejection of unburnt propellant materials. Another prior art means used to increase system efficiency was to have the cartridge case perforated with large numbers of holes to port the gas into the chamber around the outside of the case before it could be exhausted through the nozzle. The trapping arrangement has been an unsatisfactory solution because it had only limited success in increasing the efficiencies of recoilless gun systems. The trapping arrangement requires additional charge weight to be included in the system. In addition, non-uniform ignition is not eliminated and the propellant is still unsupported during combustion. Also hardware components required for the prior art systems generally require complicated and hence costly fabrication methods and increased system weight.

SUMMARY OF THE PRESENT INVENTION

The present invention relates to a propellant charge configuration which provides a new lightweight grain support mechanism which orients the charge to allow simultaneous ignition, more uniform gas flow, and controlled burning characteristics throughout the combustion cycle. The grain support mechanism of the present invention comprises circular rings supported in the combustion chamber of a recoilless gun round by having equally spaced longitudinal blocks. Propellant strips are mounted on parallel spaced support rings through holes in the propellant strips. The support rings help control the strip orientation within the munition combustion chamber and prevent their movement during the combustion cycle. Propellant strips may be produced from embossed sheets, or from plain flat sheets in combination with spacer washers, to provide channels through which the propellant can be simultaneously ignited and exhaust gases more uniformly exhausted. The present invention has produced substantial increases in projectile muzzle velocity and approximately 150% increase in muzzle energy.

One of the objects of the present invention is to provide a lightweight propellant grain support device, for munitions used in recoilless rifles, which orients the propellant charge to allow for simultaneous ignition and uniform gas flow.

Another object of the present invention is to provide a lightweight propellant grain support device, for munitions used in recoilless rifles, which substantially increases the muzzle velocity of the projectile.

Another object of the present invention is to provide a lightweight propellant grain support device which insures a propellant charge configuration which has ignition uniformity.

Another object of the present invention is to provide a propellant charge configuration having improved controlled interior ballistics.

Another object of the present invention is to provide a propellant charge configuration having controlled gas porting which limits erosive burning and has improved structural integrity.

Another object of the present invention is to provide a propellant charge configuration which increases the muzzle energy up to approximately 150% over conventional propellant packed-bed configurations.

A further object of the present invention is to provide a grain support mechanism which has a minimal amount of unburnt propellant that can be ejected from the munition nozzle.

For a better understanding of the present invention, together with other and further objects thereof, reference is made to the following descriptions taken in connection with the accompanying drawings.

BRIEF DESCRIPTION OF THE DRAWINGS

FIG. 1 is an isometric cut-away view of the propellant grain support assembly.

FIG. 2 is an isometric view of the propellant strip.

Throughout the following description like reference numerals are used to denote like parts of the drawings.

DESCRIPTION OF THE PREFERRED EMBODIMENTS

Referring now to FIGS. 1 and 2 the grain support mechanism comprises a plurality of split interlocking circular support rings 10 and 12 which are held together by locking spring pins 14 and 16 respectively. The diameter of support rings 10 and 12 are such that when propellant strips 18 and longitudinal support blocks 20 are mounted thereon, the resultant cylindrical assembly will slide into the combustion chamber, not shown, of a recoilless rifle. Propellant strips 18 are mounted on rings 10 and 12 through holes 22. Support blocks 20 are mounted on rings 10 and 12 through holes 24 so that they are equally spaced on the rings 10 and 12 with propellant strips intermediate each block 20. The combination of blocks 20 and rings 10 and 12 with the strips 18 intermediate the blocks into a cylindrical assembly controls orientation of the strips 18 and prevents their movement during the combustion cycle.

In operation after the propellant charge is assembled into the recoilless rifle combustion chamber, not shown, the initial function of the grain support mechanism, shown in FIG. 1, is to maintain position of the propellant strips 18 in a radial orientation to achieve simultaneous ignition of all propellant surfaces by a central igniter tube assembly not shown. After ignition the support rings 10 and 12, passing through holes 24 in each propellant strip 18, form a mechanical connection which maintains the position of the propellant strips 18 until the web has burnt sufficiently enough to insure complete combustion within the chamber. Axial and transverse loads resulting from gas flow through propellant strip channel 26 are transmitted to the longitudinal support blocks 20 via the support rings 10 and 14. The longitudinal support blocks 20 are structurally designed to have sufficient strength to maintain the structural integrity of the propellant grain support assembly during the complete ignition phase.

The foregoing disclosure and drawings are merely illustrative of the principles of this invention and are not to be interpreted in a limiting sense. We wish it to be understood that we do not desire to be limited to the exact details of construction shown and described for obvious modifications will occur to a person skilled in the art.

Having thus fully described the invention, what is claimed as new and desired to be secured by Letters Patent of the United States is:

1. A propellant grain support apparatus which comprises:
    a plurality of channeled propellant grain strips having a plurality of holes therethrough;
    a plurality of longitudinally equally spaced support blocks positioned intermediate said grain strips, said support blocks having a plurality of holes therethrough which are axially aligned with the holes of said grain strips;
    a plurality of split interlocking support rings which pass through the holes of said grain strips and said support blocks, wherein said rings, blocks and strips form a cylindrically shaped propellant charge assembly which after being placed in the combustion chamber of a recoilless rifle maintains a radial orientation during firing to achieve simultaneous ignition of propellant surfaces, controlled interior ballistics and controlled gas porting.

2. A propellant grain support apparatus as recited in claim 1 wherein the grain strips further include a plurality of rectangularly shaped strips having parallel channel surfaces thereon.

3. A propellant grain support apparatus as recited in claim 1 wherein the grain strips are embossed.

4. A propellant grain support apparatus as recited in claim 1 wherein the propellant grain strips comprise:
    a plurality of plain sheet propellants; and
    spacer washers positioned intermediate said plain sheet propellants to provide channels through which the propellant surfaces of said sheets are ignited and through which gas produced can be exhausted.

* * * * *